US006887128B2

(12) United States Patent
Pierse

(10) Patent No.: US 6,887,128 B2
(45) Date of Patent: May 3, 2005

(54) METHOD OF REDUCING THERMAL DISTORTION IN GRINDING MACHINES

(75) Inventor: Michael George Pierse, Bedford (GB)

(73) Assignee: UNOVA UK Limited, Aylesbury (GB)

( * ) Notice: Subject to any disclaimer, the term of this patent is extended or adjusted under 35 U.S.C. 154(b) by 0 days.

(21) Appl. No.: 10/476,114

(22) PCT Filed: Jan. 7, 2002

(86) PCT No.: PCT/GB02/00003

§ 371 (c)(1),
(2), (4) Date: Oct. 24, 2003

(87) PCT Pub. No.: WO02/076676

PCT Pub. Date: Oct. 3, 2002

(65) Prior Publication Data

US 2004/0166772 A1 Aug. 26, 2004

(30) Foreign Application Priority Data

Mar. 22, 2001 (GB) .............................. 0107147

(51) Int. Cl.⁷ ................................. B24B 1/00
(52) U.S. Cl. .............................. 451/7; 451/10; 451/11; 451/53
(58) Field of Search .............................. 451/7, 8, 9, 10, 451/11, 53

(56) References Cited

U.S. PATENT DOCUMENTS

| 4,450,652 A | * | 5/1984 | Walsh | 451/7 |
| 4,587,765 A | * | 5/1986 | Matsui | 451/28 |
| 5,556,321 A | * | 9/1996 | Kasahara et al. | 451/5 |
| 5,871,389 A | * | 2/1999 | Bartlett et al. | 451/5 |
| 6,301,009 B1 | * | 10/2001 | Tinker | 356/511 |
| 6,383,057 B1 | * | 5/2002 | Bartlett et al. | 451/7 |

* cited by examiner

Primary Examiner—Eileen P. Morgan
(74) Attorney, Agent, or Firm—Reising, Ethington, Barnes, Kisselle, P.C.

(57) ABSTRACT

The invention provides a method of reducing thermal distortion in grinding machines. Such machines each comprise a machine base (60) and a grinding wheel (50) for grinding components in the machine (10). The method includes the steps of: (a) sensing a first temperature at an upper surface of the base (60) substantially below a position (110) in the machine (10) whereat component grinding using the wheel (50) occurs; (b) sensing a second temperature of an underside surface of the base (60) substantially below the position (110) whereat component grinding occurs; (c) determining a relationship between component size drift and changes in a difference between the first and second temperatures; and thereafter (d) correcting a positional offset applied to the wheel (50) during grinding in accordance with the determined relationship, thereby reducing the component size drift. Preferably, the relationship is substantially a linear function of the form $MDS=K_f(\Delta T_1-\Delta T_2)$ although higher-order polynom be applied if required. The invention also relates to grinding machines (10) employing the method of reducing thermal distortion.

20 Claims, 3 Drawing Sheets

METHOD OF REDUCING THERMAL DISTORTION IN GRINDING MACHINES

FIELD OF THE INVENTION

The present invention relates to a method of reducing thermal distortion in grinding machines, such distortion resulting in size drift in components manufactured using the machines. The invention relates in particular, but not exclusively, to a method of reducing thermal distortion in grinding machines comprising associated machine bases over which a coolant flows in operation.

BACKGROUND TO THE INVENTION

It is generally known that components manufactured in grinding machines comprising associated machine bases can suffer component size drift as a consequence of small movements and distortions in the bases. In a grinding machine comprising a base where a coolant fluid flows over the base, it is a logical conclusion that distortions can at least to some extent be affected by the temperature of the fluid.

The inventor has appreciated that size drift in components manufactured in grinding machines employing associated base cooling can be reduced by applying a simple correction method to the machines.

SUMMARY OF THE INVENTION

According to a first aspect of the present invention, there is provided a method of reducing thermal distortion in a grinding machine comprising a machine base and a grinding wheel for grinding components in the machine, the method including the steps of:
(a) sensing a first temperature at an upper surface of the base substantially below a position in the machine whereat component grinding using the wheel occurs;
(b) sensing a second temperature of an underside surface of the base substantially below the position whereat component grinding using the wheel occurs;
(c) determining a relationship between component size drift and changes in a difference between the first and second temperatures; and thereafter
(d) correcting a positional offset applied to the wheel during grinding in accordance with the determined relationship, thereby reducing the component size drift.

The invention provides the advantage that the method is capable of reducing component size drift.

In practice, a coolant fluid is employed when grinding for cooling and removing grinding debris. The coolant fluid can be susceptible to transient temperature fluctuations. Thus, preferably, the base includes a panel at its upper surface and the first temperature is measured within the panel away from an upper facing exterior surface of the panel susceptible to being exposed to the coolant fluid.

In order to ensure that the first temperature is relatively unaffected by transient temperature fluctuations of the coolant fluid, it is preferable that the first temperature is measured at a distance in a range of 60% to 90% of the thickness of the panel away from the upper facing exterior surface.

From detailed studies, the inventor has determined that the first temperature is beneficially measured in a coolant fluid gully included in the machine below the position whereat grinding occurs, the gully being included for collecting coolant fluid output from the position whereat grinding occurs.

The inventor has found it convenient to measure the first temperature using a probe which is substantially thermally isolated from any coolant fluid flowing over the upper surface of the base. When determining a measurement position, the gully is most appropriate when attempting thermal distortion correction.

The probe preferably provides an accurate indication of the first temperature. Thus, preferably, the first temperature is measured using a probe which is in thermal communication with the upper surface of the base by mediation of a heat conductive paste. The inventor has found it especially convenient to employ a heat conductive paste comprising silicone.

Preferably, for convenience of installation and adjustment, the second temperature is measured using a probe magnetically attached to the underside surface of the base.

During studies, the inventor has found it beneficial to achieving effective thermal distortion correction to arrange for the position whereat component grinding occurs and the positions at which the first and second temperatures are measured to be mutually substantially co-linear.

In a general situation, the inventor has found it beneficial to arrange for the relationship to be of the form $$MSD = K_f(b_1(\Delta T_1 - \Delta T_2) + b_2(\Delta T_1 - \Delta T_2)^2 + \ldots + b_m(\Delta T_1 - \Delta T_2)^m)$$

wherein MSD is a grinding correction applied, $K_f$, $b_1$ to $b_n$ are proportionality constants, $\Delta T_1$ is the first temperature, $\Delta T_2$ is the second temperature, and n is a positive integer.

In practice, the inventor has found that the correction required does not change abruptly with temperature. Thus, it is preferable that the relationship is a linear, quadratic or cubic function. Such lower-order functions are relatively easy to cope with when calculating their coefficients from test trials.

The inventor has found it especially appropriate to apply a linear correction for thermal distortion. Thus, preferably, the relationship is substantially a linear function of the form $$MSD = K_f(\Delta T_1 - \Delta T_2)$$

Moreover, the inventor has evaluated from trials that, for one type of grinding machine, the proportionality constant $K_f$ is preferably in a range of 25 to 35 $\mu$m/° C., namely the constant $K_f$ is beneficially substantially 30 $\mu$m/° C.

When determining the relationship, it is more complex to characterise the grinding machine when feedback is applied thereearound. Thus, one or more of the proportionality constants are preferably calculated empirically from open-loop trials undertaken on the machine where temperature correction derived from the base is not applied.

In order to achieve a satisfactory degree of correction, the first and second temperatures are measured to a resolution of at least 0.1° C. More preferably, the first and second temperatures are measured to a resolution of at least 0.05° C. If measurement technique allows, it is most preferable that the first and second temperatures are measured to a resolution of at least 0.01° C.

According to a second aspect of the present invention, there is provided a grinding machine employing the method according to the first aspect of the invention, the machine comprising a machine base and a grinding wheel for grinding components in the machine, the machine further comprising:
(a) first temperature sensing means for sensing a first temperature at an upper surface of the base substantially below a position in the machine whereat component grinding using the wheel occurs;
(b) second temperature sensing means for sensing a second temperature of an underside surface of the base substantially below the position whereat component grinding using the wheel occurs; and (c) computing means for receiving first and second temperature measurements from the first and second sensing means respectively and for calculating therefrom a correction factor for applying to actuating means for moving the wheel relative to a component to be ground, thereby reducing component size drift.

Preferably, the machine includes a coolant fluid gully substantially below the position in the machine whereat component grinding occurs, the first sensing means being spatially located within the gully. The inventor has found from studies that the gully is a particularly appropriate location whereat to measure the first temperature in order to obtain effective thermal distortion correction.

Conveniently, for ease of installation and adjustment, the second sensing means comprises a second temperature sensing probe magnetically attached to the underside surface of the base.

For accurate temperature measurement in an environment where considerable electrical interference is experienced, for example on account of the use of electronic motor control equipment, the second sensing probe preferably includes a platinum resistance thermometer for measuring the second temperature. Most preferably, the platinum resistance thermometer is a Pt-100 type resistance thermometer.

Preferably, the first sensing means is not directly exposed to coolant fluid flowing on an upper surface of the base as such fluid is susceptible to transient temperature fluctuations. Thus, beneficially, the base comprises an upper panel into which the first sensing means is mounted. More preferably, the first sensing means includes a first sensing probe which is spatially located within the upper panel and is substantially thermally isolated from the coolant fluid flowing over the upper surface of the base.

When designing the machine, the inventor has found it beneficial to mount the first sensing means in a blind hole machined into the upper panel. Preferably, the blind hole is prefilled with heat conductive paste prior to installing the first sensing means into the hole. Use of such paste assists to ensure that the first sensing means it not greatly influenced by the ingress of coolant fluid and is also in effective thermal communication with the upper surface of the base. The inventor has found it especially preferable to employ a conductive paste including silicone, silicone being hydrophobic and thereby repelling the coolant fluid.

Preferably, the blind hole is bored to a depth corresponding to in a range of 60% to 90% of the thickness of the panel, and the first sensing probe is mounted substantially at the bottom of the hole. This range is effective at ensuring that the first probe is sufficiently far from the upper surface of the base where the coolant fluid flows but not so deep that there is a risk that the hole breaks through into a central region of the base during base manufacture.

The first probe is preferably mechanically shielded by a carrier for installation into the machine. The carrier is preferably a poor heat conductor, otherwise transient temperature fluctuations of the coolant fluid could influence the first probe. Thus, preferably, the first probe is mounted on the carrier for retention in the hole, the carrier being fabricated from a substantially thermally insulating polymer. More preferably, the polymer includes one or more of nylon, polycarbonate, polyethylene, polypropylene and fibre-reinforced phenolic resin. Such a polymer is susceptible to being easily machined or moulded.

For ease of installation and maintenance, the carrier is conveniently retained by means of a screw thread into the hole.

In order to implement the method of reducing thermal distortion according to the first aspect in the machine, a reliable and accurate temperature measurement is required. Thus, preferably, the first sensing probe is a platinum resistance thermometer. More preferably, the first sensing probe is a Pt-100 type platinum resistance thermometer.

The method of the invention according to the first aspect may be applied to existing grinding machines by way of retro-fitting. Such retro-fitting involves attaching two temperature sensors and also installing a software addition to the controlling means to enable correction of the grinding wheel offset during use. Preferably, the software addition is operable to provide soft keys for enabling or disabling component size drift correction according to the first aspect of the invention.

DESCRIPTION OF EMBODIMENTS OF THE INVENTION

Embodiments of the invention will now be described, by way of example only, in which.

Figure 1:
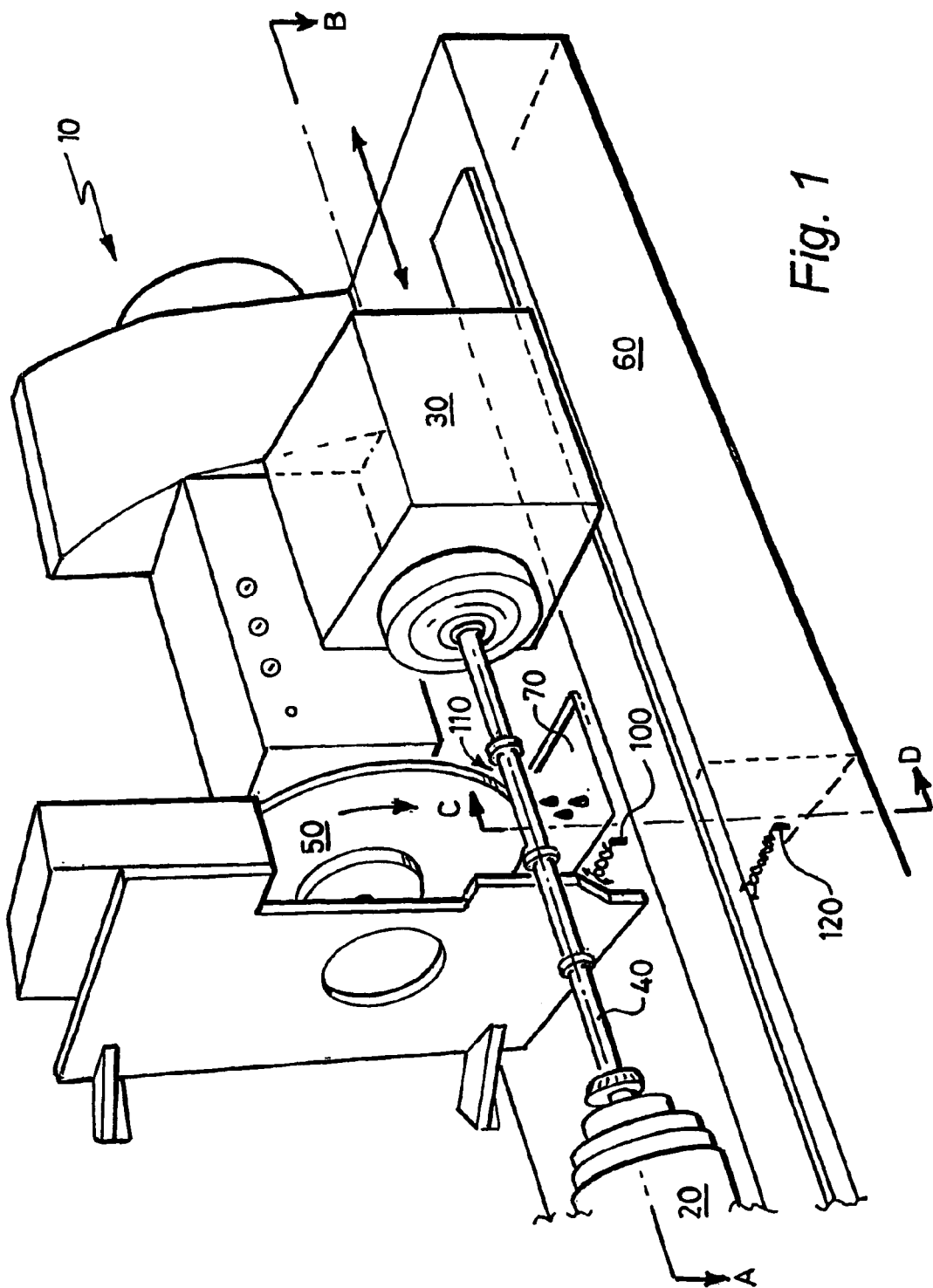
FIG. 1 is an illustration of a grinding machine equipped with temperature sensing probes according to the invention.

Referring now to FIG. 1, a grinding machine is indicated generally by 10. The machine 10 comprises a headstock 20 and a tailstock 30 between which an elongate component 40 for grinding is mounted, for example a stainless steel tubular component. The machine 10 further comprises a grinding wheel 50 with its associated support structure including one or more wheel drive motors. Moreover, the machine 10 includes a control unit (not shown) for controlling its operation, the unit comprising a computer executing machine control software. The wheel 50 with its associated structure, and the tailstock 30 and headstock 20 are all mounted on a base 60 of the machine 10.

Operation of the machine 10 will now be described in overview.

In operation, the control unit actuates the grinding wheel 50 relative to the component 40. The grinding wheel 50 is rotated and brought into contact with the component 40 for grinding material therefrom and thereby machining the component 40. When necessary, the component 40 is rotated about its elongate axis A–B so as to bring different parts of the component 40 into contact with the wheel 50. A coolant fluid is sprayed onto the component 40 and the wheel 50 during grinding, the fluid being collected into a gully 70 in the base 60 for subsequent filtration and recirculation.

The machine 10 will now be described in further detail.

The machine 10 includes a first temperature probe 100 for measuring a first temperature of an upper surface of the base 60, the first probe 100 being attached to the base 60 below a position indicated by 110 whereat grinding of the component 40 occurs. More preferably, the first probe 100 is mounted in the gully 70. Moreover, the machine 10 further includes a second temperature probe 120 for measuring a second temperature of an underside surface of the base 60, the second probe 120 being attached substantially vertically below the first probe 100 and the position 110 where grinding occurs.

Outputs from the first and second probes 100, 120 are connected to the aforesaid control unit so that its software receives data indicative of the temperatures of the upper and underside surfaces of the machine base 60.

The second probe 120 is conveniently a magnetically-retained device which is simply applied to the underside surface of the base 60. The second probe 120 can alternatively be bolted or clamped into position on the underside surface of the base 60. However, the inventor has found that the second probe 120 is susceptible to being influenced by transient air drafts flowing around the underside of the base 60. In order to desensitize the second probe 120 from such draughts, the inventor has found it beneficial to include thermal insulation around the probe 120 except where the probe 120 contacts onto the underside surface of the base 60. Such thermal insulation can include a cloth cover, an expanded-plastics foam cover or simply a plastics material shell. Thus, the second probe 120 is preferably in intimate thermal contact with the underside of the base 60 but shielded from airflow on the underside of the base 60.

In devising the invention, the inventor has had to evolve the design of the first probe 100 to make it suitable for mounting onto the upper surface of the base 60.

Figure 2:
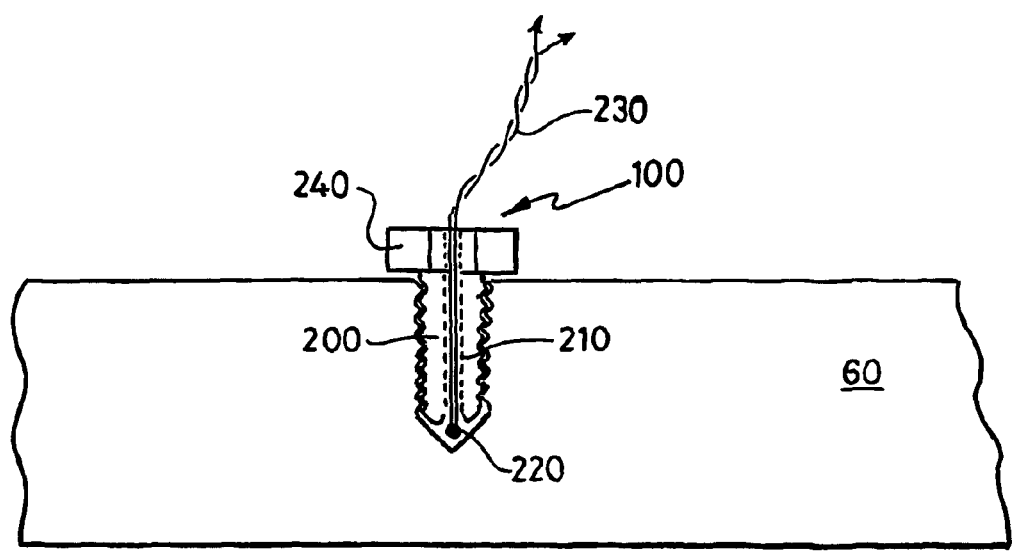
FIG. 2 is a schematic diagram of a temperature sensing probe adapted for measuring the temperature at an upper surface of a base of the machine illustrated in FIG. 1.

Referring now to FIG. 2, there is shown the first probe 100 installed into a blind hole machined into an upper exterior surface of the base 60. The probe 100 comprises a body section 200 fabricated from a hexagonal-top M12 Nylon bolt through which a longitudinal axial hole 210 has been moulded or bored. The probe 100 further comprises a temperature sensing platinum resistance tip 220 connected to a twisted pair of wires 230. The tip 220 is located at an end region of the bolt 200 remote from a hexagonal head region 240 of the bolt 200. Moreover, the wires 230 are routed from the tip 220 through the axial hole 210 to the head region 240 wherefrom the wires 230 are further conveyed to the control unit.

Although the bolt 200 is fabricated from nylon, it can alternatively be fabricated from another substantially thermally insulating polymer, for example polypropylene, polyethylene, fabric-reinforced phenolic resin or polycarbonate. Mixtures of these polymers can also be employed.

The probe 100 is mounted within a blind M12 tapped hole machined into the upper surface of the base 60 as illustrated. When installing the probe 100 into the blind hole, it has been found by the inventor to be especially desirable to prefill the hole with white heat conductive silicone paste, for example as conventionally employed for improving heat conductivity from power semiconductor devices such as TO3 can-mounted power transistors to associated finned heatsinks. Inclusion of the paste is also effective at reducing the ingress of coolant fluid to the resistance tip 220; the silicone paste is generally hydrophobic. The base 60 is a relatively substantial grinding machine part fabricated from cast iron having an upper surface panel thickness in the order of 3 to 5 cm. The blind hole is preferably bored in a range of 60% to 90% through the thickness of the upper surface panel.

The inventor has found that the probe 100 is highly effective at measuring the temperature of the upper surface of the base 60 at the same time as being relatively insensitive to transient temperature fluctuations of the coolant fluid sprayed during machine operation over the component 40 and the wheel 50. Such insensitivity is achieved by virtue of the bolt 200 being fabricated from a substantially thermally insulating material. A thermally insulating material is defined as a material having a thermal conductivity of less than 1 W m$^{-1}$ K$^{-1}$.

When developing the invention, the inventor initially used magnetically-retained probes applied to both the upper exterior surface of the base 60 and to the underside surface of the base 60 for measuring a temperature difference therebetween. During such development, the inventor found that the magnetically-retained probe applied on the upper exterior surface was rather susceptible to transient temperature fluctuations in the coolant fluid. Thus, the inventor has appreciated that mounting the first probe 100 slightly into the base 60 circumvents such transient fluctuations, thereby rendering the method of the invention more accurate and reliable.

The inventor found that temperature differences between the upper and lower surfaces of the base 60 can be relatively small, for example less than 1° C. in some grinding situations. Thus, the probes 100, 120 preferably have a differential temperature measuring resolution of at least 0.1° C. More preferable, the probes 100, 120 have a differential temperature measuring resolution of at least 0.05° C. Most preferably, the probes 100, 120 have a differential temperature measuring resolution of at least 0.01° C.

When measuring small temperature differences of 0.5° C. or less, it is conventional practice to employ thermocouples connected in differential mode. The inventor has found that such a differential arrangement is unsatisfactory because of electrical interference in the environment surrounding the machine 10, for example due to high power electronic motor control equipment. Moreover, although thermistor temperature sensors are highly sensitive, they are generally insufficiently stable to render them suitable for measuring the temperature difference between the upper surface and underside surface of the base 60. The inventor has therefore found that platinum resistance thermometers are most appropriate despite the need to perform an accurate calibration of the probes 100, 120. The probes 100, 120 preferably employ Pt-100 type platinum resistance thermometers.

The inventor has found that, despite including structural features to enhance the rigidity of the base 60, uncompensated grinding accuracy of the machine 10 is sensitive to the temperature difference between the first and second probes 100, 120. In one example design of grinding machine, grinding errors of 6 μm were found to correlate with temperature differences of 0.1° C. between the probes 100, 120.

Figure 3:
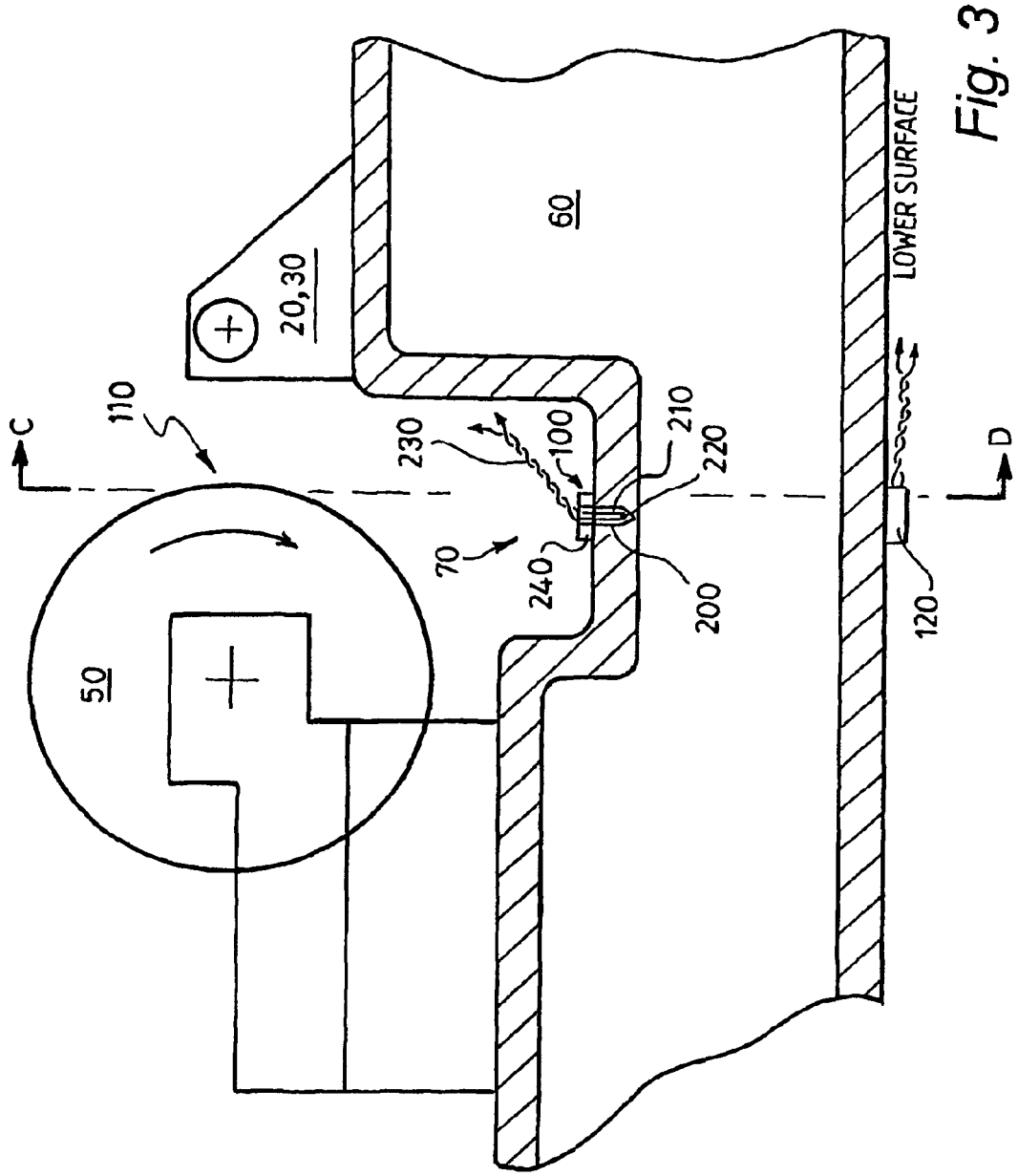
FIG. 3 is an illustration of a part of the machine shown in FIG. 1.

Referring now to FIG. 3, there is shown a set-up of the machine shown in FIG. 1. The first probe 100 is mounted substantially vertically above the second probe 120, the probes 100, 120 being substantially co-linear along an axis C–D with the grinding region 110.

The inventor has appreciated that the core temperature of the base top surface directly below the grinding region 110 correlates closely with size drift when machining the component 40. Moreover, the inventor has appreciated that the temperature of the underside of the base 60 further improves the degree of correlation, especially when the temperature of the base 60 converges towards the temperature of the coolant fluid.

The inventor has further appreciated that an empirical relationship pertains to a diametrical machining size drift (MSD) in μm when grinding the component 40 and changes in first and second probe temperatures denoted by $\Delta T_1$ and $\Delta T_2$ respectively, the relationship as provided in Equation 1 (Eq. 1):

$$MSD = K_f(\Delta T_1 - \Delta T_2) \qquad \text{Eq. 1}$$

where $K_f$ = a proportionality constant (μm/° C.).

For one type of grinding machine modified to include the probes 100, 120 as described in the foregoing, a value for the constant $K_f$ in a range of 25 to 35 was found to be consistently correct; namely, the constant $K_f$ preferably has a value of substantially 30. However, this value for the constant $K_f$ would be expected to change if the type of grinding machine were changed.

In grinding machine trials applying a correction as defined by Equation 1, improvements in component batch grinding accuracy in a range of 63% to 81% were achieved. Such accuracy improvement was attainable in both simulated intermittent and continuous batch grinding conditions. Moreover, the accuracy improvement was attainable irrespective of whether or not bedwash and wheel 50 spindle weir coolant had been left running.

Applying the correction defined in Equation 1 to an operating grinding machine over a period of 3 days was found by the inventor to reduce component size drift from 254 $\mu$m to 69 $\mu$m.

The inventor has appreciated that a dominant effect responsible for grinding inaccuracy in a grinding machine is attributable to the temperature of a coolant fluid affecting a base of the machine, and not significantly due to any heat generated by the grinding process itself or from wheel wind-age. It is conventional design practice to route such coolant fluid through a gully formed in the base of the machine situated below a region of the machine in which component grinding occurs.

In the foregoing, it will be appreciated that modifications and additions can be made to the embodiments elucidated in the foregoing without departing from the scope of the invention.

For example, although Equation 1 provides a linear relationship between the temperature difference between the first and second probes 100, 120, it is possible for the relationship to be of a more general polynomial form as expressed in Equation 2 (Eq. 2):

$$MSD = K_f G(\Delta T_1, \Delta T_2) \quad \text{Eq. 2}$$

where $$G(\Delta T_1, \Delta T_2) = b_1(\Delta T_1 - \Delta T_2) + b_2(\Delta T_1 - \Delta T_2)^2 + b_3(\Delta T_1 - \Delta T_2)^3 + \ldots b_n(\Delta T_1 - \Delta T_2)^n$$

and where
$b_1, \ldots b_n$ = proportionality constants.

Such a more general polynomial form in Equation 2 includes Equation 1 within its scope by virtue of the constant $b_1$ being unity and the constants $b_2$ to $b_n$ being zero.

The function G is a polynomial function having $\Delta T_1$ and $\Delta T_2$ as input parameters. Thus, the function G can, for example be a quadratic function, a cubic function or an even higher-order function. Moreover, the function G can also be modified to include a time parameter, for example time from machine switch-on so that warm-up inaccuracies can also be compensated.

The inventor has found from trials with grinding machines that the constant $K_f$ and the constants $b_1$ to $b_n$ can be determined empirically from machining accuracy data collated during the trials. The trials are best performed with the compensation according to one or more of Equations 1 and 2 disabled, namely with a grinding machine under trial operating open-loop with regard to temperature compensation derived from its differential machine base temperature.

If required, data corresponding to machine base temperatures and ground component metrology results, and optionally also time information, can be input to curve-fitting software executing on a computer for determining constants such as the constant $K_f$ and the constants $b_1$ to $b_n$ appropriate to employ in, for example, operating software for controlling the machine 10 for improving its grinding accuracy.

What is claimed is:

1. A method of reducing thermal distortion in a grinding machine comprising a machine base and a grinding wheel for grinding components in the machine, the method including the steps of:

(a) sensing a first temperature at an upper surface of the base substantially below a position in the machine whereat component grinding using the wheel occurs;

(b) sensing a second temperature of an underside surface of the base substantially below the position whereat component grinding using the wheel occurs;

(c) determining a relationship between component size drift and changes in a difference between the first and second temperatures; and thereafter (d) correcting a positional offset applied to the wheel during grinding in accordance with the determined relationship; thereby reducing the component size drift.

2. The method according to claim 1, wherein the base includes a panel at its upper surface and the first temperature is measured within the panel away from an upper facing exterior surface of the panel susceptible to being exposed to a coolant fluid.

3. The method according to claim 2, wherein the first temperature is measured at a distance in a range of 60% to 90% of the thickness of the panel away from the upper facing exterior surface.

4. The method according to claim 1, wherein the first temperature is measured using a probe which is substantially thermally isolated from any coolant fluid flowing over the upper exterior surface of the base.

5. The method according to claim 1, wherein the first temperature is measured using a probe which is in thermal communication by mediation of a heat conductive paste with the upper surface of the base.

6. The method according to claim 1, wherein the second temperature is measured using a probe magnetically attached to the underside surface of the base.

7. The method according to claim 6, wherein the probe used for measuring the second temperature is provided with a thermally insulating shield to render it insensitive to transient temperature fluctuations in air flowing over the underside surface of the base.

8. The method according to claim 1, wherein the relationship is of the form: $MSD = K_f(b_1(\Delta T_1 - \Delta T_2) + b_2(\Delta T_1 - \Delta T_2)^2 + \ldots + b_n(\Delta T_1 - \Delta T_2)^n)$, wherein:

(a) MSD is a grinding correction applied;

(b) $K_f$, $b_1 \ldots b_n$ are proportionality constants;

(c) $\Delta T_1$ is the first temperature;

(d) $\Delta T_2$ is the second temperature; and, (e) n is a positive integer.

9. The method according to claim 8, wherein the relationship is substantially a linear function of the form: $MDS = K_f(\Delta T_1 - \Delta T_2)$.

10. The method according to claim 9, wherein the proportionality constant $K_f$ is in a range of 25 to 35 $\mu$m/° C.

11. The method according to claim 8, wherein one or more of the proportionality constants are calculated empirically from open-look trials undertaken on the machine where temperature correction derived from the base is not applied.

12. The method according to claim 1, wherein the first and second temperatures are measured to a resolution of at least 0.1° C.

13. A grinding machine including a machine base and a grinding wheel for grinding components in the machine, with the use of a coolant fluid, the machine comprising:
  (a) first temperature sensing means for sensing a first temperature at an upper surface of the base substantially below a position in the machine whereat component grinding using the wheel occurs;
  (b) second temperature sensing means for sensing a second temperature of an underside surface of the base substantially below the position whereat component grinding using the wheel occurs; and,
  (c) computing means for receiving first and second temperature measurements from the first and second sensing means respectively and for calculating therefrom a correction factor for applying to actuating means for moving the wheel relative to a component to be pound, thereby reducing component size drift.

14. The machine according to claim 13, wherein the machine includes a coolant fluid gully substantially below the position in the machine whereat component grinding occurs, the first sensing means being spatially located within the gully.

15. The machine according to claim 13, wherein the second sensing means comprises a second temperature sensing probe magnetically attached to the underside surface of the base, and is provided with a thermally insulating shield to render it insensitive to transient temperature fluctuations in air flow over the underside surface.

16. The machine according to claim 13, wherein the base comprises an upper panel into which the first sensing means is mounted.

17. The machine according to claim 16, wherein the first sensing means includes a first sensing probe which is spatially located within the upper panel and is substantially thermally isolated from any coolant fluid flowing over the upper surface of the base.

18. The machine according to claim 17, wherein the first sensing means is mounted in a blind hole bored to a depth corresponding to 60% to 90% of the thickness of the panel and the first sensing probe is mounted substantially at the bottom of the hole.

19. The machine according to claim 18, wherein the first probe is mounted on a carrier for retention in the hole, the carrier being fabricated from a substantially thermally insulating polymer.

20. The machine according to claim 13, wherein the first sensing probe is a platinum resistance thermometer.

* * * * *

UNITED STATES PATENT AND TRADEMARK OFFICE
CERTIFICATE OF CORRECTION

PATENT NO. : 6,887,128 B2
DATED : May 3, 2005
INVENTOR(S) : Pierse

It is certified that error appears in the above-identified patent and that said Letters Patent is hereby corrected as shown below:

Title page,
Item [57], ABSTRACT,
Line 18, after "higher-order" delete "polynom" and insert therein -- polynomial correction can --

Column 2,
Line 23, after "MSD=$K_f$($b_1$ ($\Delta T_1$ -$\Delta T_2$)+$b_2$($\Delta T_1$ -$\Delta T_2$)$^2$ +" delete "...+$b_m$($\Delta T_1$ -$\Delta T_2$)$^m$)" and insert therein -- ...+$b_n$($\Delta T_1$ -$\Delta T_2$)$^n$ --

Column 3,
Line 40, after "first sensing means" delete "it" and insert therein -- is --

Column 9,
Line 17, after "a component to be" delete "pound" and insert therein -- ground --

Signed and Sealed this

Ninth Day of August, 2005

JON W. DUDAS
*Director of the United States Patent and Trademark Office*